United States Patent
Chapman

(10) Patent No.: US 8,481,453 B2
(45) Date of Patent: Jul. 9, 2013

(54) CAPTURE OF VOLATILIZED VANADIUM AND TUNGSTEN COMPOUNDS IN A SELECTIVE CATALYTIC REDUCTION SYSTEM

(75) Inventor: David M. Chapman, Ellicott City, MD (US)

(73) Assignee: Millenium Inorganic Chemicals, Inc., Hunt Valley, MD (US)

( * ) Notice: Subject to any disclaimer, the term of this patent is extended or adjusted under 35 U.S.C. 154(b) by 1 day.

(21) Appl. No.: 13/249,919

(22) Filed: Sep. 30, 2011

(65) Prior Publication Data

US 2012/0058031 A1    Mar. 8, 2012

Related U.S. Application Data

(62) Division of application No. 12/638,166, filed on Dec. 15, 2009.

(51) Int. Cl.
*B01J 23/00* (2006.01)

(52) U.S. Cl.
USPC ......... 502/350; 502/353; 502/232; 423/213.2

(58) Field of Classification Search
USPC .................. 502/304, 338, 208, 345, 324, 73, 502/74, 350, 353, 232; 423/213.2, 213.5
See application file for complete search history.

(56) References Cited

U.S. PATENT DOCUMENTS

| | | | |
|---|---|---|---|
| 6,805,849 B1 | 10/2004 | Andreasson et al. | |
| 7,225,613 B2 | 6/2007 | Hammerle et al. | |
| 7,264,785 B2 | 9/2007 | Blakeman et al. | |
| 7,498,010 B2 | 3/2009 | Andreasson et al. | |
| 7,628,968 B2 | 12/2009 | Augustine et al. | |
| 2005/0069476 A1 | 3/2005 | Blakeman et al. | |
| 2006/0182676 A1 | 8/2006 | Tran et al. | |

OTHER PUBLICATIONS

Casanova et al., High-temperature stability of VeO5/TiO2-WO3-SiO2 SCR catalysts modified with rare-earths, 2006, Journal of Alloys and Compounds, 408-412, 1108-1112.*
Cavataio, et al.; "Laboratory Testing of Urea-SCR Formulation to Meet Tier 2 Bin" *Society of Automotive Engineers*; Paper No. 2007-01-1575, DOI: 10.4271/2007-01-1575, pp. 455-468 (Apr. 16, 2007).
Weckhuysen, et al; "Chemistry, Spectroscopy and the Role of Supported Vanadium Oxides in Heterogeneous Catalysis"; *Catalysis Today*, vol. 78, Issues 1-4, pp. 25-46 (Feb. 28, 2003).
Wachs, et al.; "Catalysis Science of the Solid Acidity of Model Supported Tungsten Oxide Catalysts"; *Catalysis Today*, vol. 116, Issue 2, pp. 162-168 (Aug. 1, 2006).
Iler; "The Chemistry of Silica: Solubility, Polymerization, Colloid and Surface Properties, and Biochemistry"; John Wiley & Sons, New York, ISBN 0-471-02404-x:31, cover pages and pp. 173-288 (1979).
PCT/US2010/056485, PCT International Search Report and Written Opinion, Jul. 1, 2011.

* cited by examiner

*Primary Examiner* — Kaj K Olsen
*Assistant Examiner* — Pritesh Darji
(74) *Attorney, Agent, or Firm* — Tanzina Chowdhury

(57) ABSTRACT

An apparatus and method for treating diesel exhaust gases are described. The system consists of two functionalities, the first being a selective catalytic reduction (SCR) catalyst system and the second being a capture material for capturing catalyst components such as vanadia that have appreciable volatility under extreme exposure conditions. The SCR catalyst component is typically based on a majority phase of titania, with added minority-phase catalyst components comprising of one or more of the oxides of vanadium, silicon, tungsten, molybdenum, iron, cerium, phosphorous, copper and/or manganese vanadia. The capture material typically comprises a majority phase of high surface area oxides such as silica-stabilized titania, alumina, or stabilized alumina, for example.

8 Claims, 3 Drawing Sheets

CAPTURE OF VOLATILIZED VANADIUM AND TUNGSTEN COMPOUNDS IN A SELECTIVE CATALYTIC REDUCTION SYSTEM

CROSS-REFERENCE TO RELATED APPLICATIONS

The present application is a divisional of U.S. Ser. No. 12/638,166, filed Dec. 15, 2009, the entire contents of which is hereby expressly incorporated herein by reference.

STATEMENT REGARDING FEDERALLY SPONSORED RESEARCH OR DEVELOPMENT

Not applicable.

BACKGROUND OF THE INVENTION

The selective catalytic reduction (SCR) of nitrogen oxides produced in combustion engines, with reductants such as urea and ammonia, is an industrially significant catalytic process. Vanadia-based SCR catalysts that utilize titania catalyst supports are approved for use for on-road mobile applications in Europe on Heavy-Duty Diesel trucks, and these catalyst are highly active and show excellent tolerance to fuels that contain sulfur. However, vanadia-based catalysts are not approved by the EPA for on-road use in the U.S. or in Japan. This lack of approval stems from the concern over release of vanadia into the environment and the potential toxicity that might arise from exposure to vanadia emitted from the tailpipe. One possible mechanism that potentially might cause a loss of vanadia from the catalyst is vaporization of the metal oxide or hydroxide at high temperature in the stream of hot exhaust gases.

Furthermore, newer regulations for soot and NOx that will begin to be imposed as early as 2010 (e.g., Euro VI and US 2010 regulations) may necessitate the use of both a diesel particulate filter (DPF) in tandem with an SCR catalyst. In one configuration (U.S. Pat. No. 7,498,010) the SCR catalyst is downstream from the DPF. If no remedial action is taken, the collection of soot on the DPF, will ultimately plug the channels for exhaust gas flow, and can cause unacceptable pressure-drop arises across the device. In order to avoid this situation, the soot is removed either continuously or sporadically by combustion. Since combustion is an exothermic process, it is associated with a rise in the temperature of the device that is transmitted to the exhaust gases, and the temperature rise depends on the amount of soot collected as well as the temperature of the exhaust gas upstream of the DPF. These high temperature exhaust gases, which can approach 750° C. and higher, subsequently will pass over the SCR catalyst. Thus, there has been much emphasis recently on improving the thermal stability of the SCR catalyst, both for vanadia-based catalysts as well as Cu—, Fe— and other base-metal catalysts. It is generally accepted that the catalyst must be stable to temperatures of up to 800° C. for short periods of time. In order to test the durability of catalyst formulations, it is necessary to develop tests that simulate real-world exposure conditions. Ford researchers[1] have developed an accelerated aging protocol for SCR catalysts that simulates on-road conditions over a span of 120,000 miles. This test involves exposing the catalyst to a reactant gas stream that includes water (5 vol %), for a time of 64 hr at 670° C. at relatively high gas flow rate (gas hourly space velocity, GHSV=30,000 $hr^{-1}$). These conditions of time and temperature are used as a reference point for the method of the present invention.

Concern over the volatility of vanadia at high temperatures, e.g., when the SCR catalyst is located downstream of the DPF, is thus an issue that may limit the available market for vanadia-based mobile SCR catalysts and is a key consideration in catalyst development. There has thus remained in the art a need to be able to evaluate the degree of vanadia volatilization from SCR catalysts. Further, there has remained a need in the art for a deNOx selective catalytic reduction catalyst system which demonstrates zero vanadia loss downstream thereof. It is an object of the invention to address these shortcomings of the prior art.

SUMMARY OF THE DISCLOSURE

The present disclosure describes compositions and processes for the capture of volatilized vanadium and tungsten compounds in a selective catalytic reduction catalyst system, for example in an emission control system of a diesel engine.

In one aspect of the disclosure, it is contemplated that stable, high surface area oxide supports, including but not limited to, silica-stabilized titania and alumina, can be employed to capture these volatile components, when said components are present at low density on the support surface of the capture bed after their capture. Further, in regard to certain embodiments, it has also been surprisingly found that when the normally volatile components are present at low density on the catalyst surface prior to exposure to extreme conditions, they also exhibit diminished volatility at the extreme conditions, so that such "low density" catalysts can also be employed to reduce or eliminate catalyst component volatility. Thus, the volatile components, once captured, preferably will not be substantially released again into the exhaust phase. Therefore, a key aspect of this invention is to provide for high stability, high surface area inorganic oxide supports that can be used in a configuration wherein the stable, high surface area supports are either mixed with, or are positioned downstream from a lower stability, V-based SCR catalyst material in which the catalyst components are present at relatively high surface density, wherein the former stable, high surface area supports capture and remove volatile compounds from the vapor phase even at the same temperature which is present in the lower stability and higher surface density catalyst material from which the compounds were volatilized.

The present summary is not intended to be an exhaustive or complete summary of the disclosure but is only intended to identify various notable aspects thereof. Other aspects of the disclosure not specifically noted above will become evident upon consideration of the description below.

DETAILED DESCRIPTION OF THE INVENTION

Figure 1:
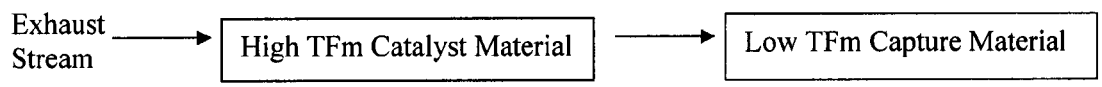
FIG. 1 is a schematic representation of one embodiment of a selective catalytic reduction catalyst system of the invention wherein the catalyst material is positioned upstream of the capture material.

In the course of investigation of the vaporization of catalyst components (supported on oxide supports) during high-temperature, accelerated aging tests, it has surprisingly been found that the catalyst components exhibit varying degrees of volatility depending on the catalyst support, and the volatilities of the supported catalyst materials can be substantially different from volatilities of the bulk oxides. In the event that the supported catalyst shows non-negligible vaporization of the catalyst components, it is desirable to provide a means of capturing the volatilized components released into the vapor stream. One means of capturing such components that are volatile at high temperature is simply to allow them to condense at a lower temperature downstream of the catalyst bed. However, this approach is problematic because the volatile components may condense on unintended locations. Thus, it is even more desirable to provide a means for capturing the volatile components even at very high sustained temperatures such as might be encountered in the catalyst bed. The present invention therefore is directed to a treatment system for diesel engine exhaust, and use therewith, which comprises a vanadia-based selective catalytic reduction catalyst (V-based SCR catalyst) system and which comprises a "capture-bed" either mixed with, or immediately downstream of the V-based SCR catalyst. The function of the capture bed is to capture and retain any volatile compounds even at elevated temperatures and gas flow conditions which approach those experienced in the catalytic portion of the catalyst/capture bed mixture, or in the upstream catalyst bed, so that the volatile components are thus removed from the vapor phase of the exhaust gas.

In one embodiment of the invention, where the catalyst material and capture bed material comprise a mixture, the v/v ratio of the catalyst material and capture bed material may be, for example, in the range of 1:20 to 20:1, and more preferably be, for example, 1:10 to 10:1.

Further, where used herein, the terms "catalyst bed," "catalyst material," and "catalyst bed material" may be used interchangeably. Similarly, the terms "capture bed, "capture material," and "capture bed material" may be used interchangeably.

Where used herein the term "substantially all" means at least 90% of the material which is referred to, or more preferably to at least 95% of the material which is referred to, or more preferably to at least 96% of the material which is referred to, or more preferably to at least 97% of the material which is referred to, or more preferably to at least 98% of the material which is referred to, or more preferably to at least 99% of the material which is referred to.

It has presently been found that stable, high surface area oxide supports, including but not limited to, silica-stabilized titania or alumina, can be employed to capture the volatile components, when said components are present at low density on the support surface of the capture bed material after their capture. Further, in regard to certain embodiments, it has also been surprisingly found that when the normally volatile components are present at low density on the catalyst surface prior to exposure to extreme conditions, they also exhibit diminished volatility at the extreme conditions, so that such "low density" catalysts can also be employed to reduce or eliminate catalyst component volatility. Thus, a key aspect of this invention is to provide for high stability, high surface area inorganic oxide supports that can be used in a configuration wherein the stable, high surface area supports are either mixed with, or are positioned downstream from a lower stability, V-based SCR catalyst material in which the catalyst components are present at relatively high surface density, wherein the former stable, high surface area supports capture and remove volatile compounds from the vapor phase even at the same temperature which is present in the lower stability and higher surface density catalyst material from which the compounds were volatilized.

This configuration, shown in a schematic diagram in FIG. 1, can be achieved, in one exemplary embodiment by preparing wash-coated catalysts that are "zoned", that is, the lower stability, higher surface density V-based SCR catalyst is located in a position in front of the device, while the high stability, high surface area low surface density inorganic oxide is located in a position that is towards the back of the device.

Figure 2:
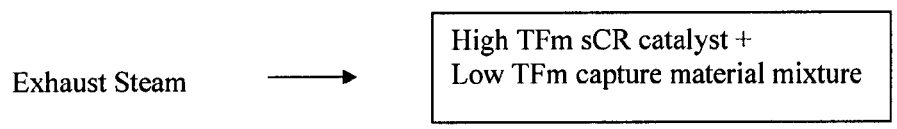
FIG. 2 is a schematic representation of another embodiment of a selective catalytic reduction catalyst system of the invention wherein the catalyst material and capture material are combined in a mixture.

Another configuration, shown in a schematic diagram in FIG. 2, can be achieved in one exemplary embodiment by the co-extrusion (or other mode of mixing) of catalyst materials and capture bed materials. When the high stability, high surface area oxide is comprised of a composition that is a good support for V-based SCR catalysts, then the capture material may be an active catalyst even as it accumulates the volatile oxides from the less stable catalyst. Titania-based materials that are suitable to be used in this configuration as the highly stable, high surface area supports are those described in a recent patent application (U.S. Ser. No. 12/533,414). It will be seen below that an example of a lower stability, higher surface density V-based SCR catalyst is 2 wt % vanadia supported on DT-52. This catalyst is nonetheless a highly active SCR catalyst under normal conditions, but exhibits considerable loss of surface area after exposure to extreme conditions. Thus, one embodiment for the present invention comprises a mixture of a vanadia on DT-52 catalyst material with the titania-based materials or catalysts described in the recent application (U.S. Ser. No. 12/533,414). For example, the mixture can be achieved either in wash-coat or extrusion applications or any other suitable method for creating highly interspersed mixtures of particulate materials. In a second embodiment, the present invention comprises a system of a high surface area, high stability alumina (or any other suitable capture bed material) positioned downstream of the vanadia on DT-52 catalyst (or any other appropriate catalytic material).

The present invention will thus enable the use of V-based SCR catalysts in configurations where the catalyst material and also the capture bed material, will be exposed to very high temperatures.

It is helpful to consider parameters that serve to define the capture materials, and one such parameter involves the surface density $\rho_{surf}$ (atoms/nm$^2$) of catalyst components on a support material. The catalyst and capture materials of the present invention are typically composed of a majority phase (mass fraction greater than about 0.7) and one or more minority phases (mass fraction less than about 0.3) wherein the minority phase is viewed as existing on the surface of the majority phase. For example, titania-based SCR catalysts typically contain a minority phase comprising vanadia (generally less than 5%), tungsta (generally less than 15%), and optionally silica (generally less than 15%), that have been deposited on the surface of the titania (majority phase). When the minority phases are present at very low mass fraction, they can exist in an atomically dispersed state, bonded solely to the support material. By contrast, when the minority phases are present at higher mass fractions, they can begin to form bonds homogeneously and thus form one or more layers on the support material. In extreme cases, the minority phases may actually crystallize, forming e.g., bulk crystalline tungsta in its native monoclinic crystalline form, in intimate mixture with the support titania. In this state, it is possible that the minority phases develop chemical character more typical of that of the bulk phase of the minority oxide. In the particular cases of vanadia and tungsta, the bulk oxides may exhibit volatility under extreme conditions of temperature, water vapor, gas flow rate and time.

As can be ascertained from the chemical literature, the maximum amount of vanadia that can be maintained in a highly dispersed state on titania without vanadia crystal formation[2] is 7.1 V atoms/nm$^2$, and this density is assumed to represent monolayer coverage. Monolayer coverage of highly dispersed tungsta on titania[3] is estimated to occur at a tungsta loading of 4.5 W/nm$^2$, and that for silica[4] is estimated to occur at a silica loading of 6 Si atoms/nm$^2$. These complete, or monolayer surface densities, $\rho_{surf,\,monolayer}$, for the highly dispersed minority phases can be used to further define the actual fractional coverage at the mass fraction, $f_{m,\,i}$, of the minority phases (i) in the real catalyst:

$$f_{m,i} = \rho_{surf,i} / \rho_{surf,monolayer,i}$$

In the case that there are multiple supported oxides (e.g., silica, tungsta and vanadia) in the real catalyst, the total fractional monolayer coverage $Tf_m$ can then be defined as the sum of the $f_{m,i}$ for each of the minority-phase supported oxides. From the above definitions, it is apparent that the combination of high majority-phase support surface area and low minority-phase mass fraction results in very low fractional coverage for the component oxides. This combination is very desirable for the capture materials of the present invention. Furthermore, since the object of the present invention is to capture volatile oxides under conditions of extreme exposure, it follows that it is highly desirable that the surface area for the majority-phase oxide be stable and not substantially decrease as a result of the exposure conditions. The relevant surface area to be used in this definition is that which is measured after exposure of the capture or catalyst materials to the severe conditions that simulate lifetime exposure. Stable surface area thus means that there is minimal loss in surface area from the fresh state (before exposure) and the aged state (after exposure). The condition of low fractional coverage is also a desirable feature of the catalyst materials themselves, as the component volatility is surprisingly found to be minimal under that condition. It follows that it is also desirable for the catalyst material to retain appreciable surface area during exposure to harsh conditions.

The examples and embodiments herein and below refer to various titania and alumina materials which may comprise the majority phase of the catalyst support material or capture bed material of the invention. However, the majority phases of the catalyst support and capture bed materials are not to be limited to these and may also comprise, alone or in combination other titanias, silica-stabilized titanias, aluminas (including, but not limited to boehmite, gamma and alpha alumina), stabilized aluminas (for example, those stabilized by lanthanum or other lanthanides), amorphous silicas, silica-aluminas, zeolites (including, but not limited to, faujasite, mordenite, ZSM-5 and Beta zeolite), and/or molecular sieves. In one embodiment, the minority phase of the capture material used in the selective catalytic reduction catalyst system of the present invention maintains a total fractional monolayer coverage on the majority phase of about 5 or less under conditions encountered in accelerated aging tests to simulate the lifetime (e.g., 120,000 miles) of on-road exposure to an SCR catalyst that is positioned downstream from a DPF. The Ford [1] test conditions are, for example, exposure to 670° C. for 64 hr with a gas-hourly space velocity (GHSV) of 30,000 hr$^{-1}$ with 5 vol % water. Other test conditions which may be employed are 750° C. for 4 hr and a GHSV of ~100,000 hr$^{-1}$ and 5 vol % water. For example, the materials referred to herein as MC-X5v1 and MC-X5v2 have $Tf_m$ less than or equal to about 3 after these exposures. In another version illustrative of a material that does not meet the requirements for capture material of the present invention, DT-52 w/2 wt % $V_2O_5$ has a $Tf_m$ greater than about 3 after exposure at the relatively mild condition of 670° C. for 4 hr with GHSV>10,000 hr$^{-1}$ and ~5% $H_2O$. Preferably, the exposure conditions simulate the lifetime exposure of the catalysts under real-world conditions. Also, the degree of aging that occurs (and hence the final surface area and $Tf_m$) also depends on vanadia content. In the present disclosure the vanadia content of the catalysts are preferably in a range of between 0.5% and 5% vanadia, and more preferably in a range of between 1% and 3% vanadia.

EXAMPLES

The following experimental apparatus was designed to provide illustration of the present invention. SCR catalyst samples consisting of catalyst components that include one or more of vanadia, tungsta and/or silica, were aged at elevated temperatures in a gas stream that contains $H_2O$ and $O_2$, each at 5 vol %, and NO and $NH_3$, each at 500 ppm, with the balance consisting of $N_2$. This gas stream is a representative mixture that approximates the composition of gases under realistic conditions. The inorganic vapors generated from the catalyst samples were then captured on a "capture bed" located downstream of the catalyst but still in the hot zone of the furnace. For the approach to be successful, the volatile component vapors, in this case, the oxides and hydroxides of vanadia and tungsta, must react rapidly and quantitatively with the capture material at the elevated temperatures of the test. If this condition is met, then the amount captured downstream also is an indirect measure of the vapor pressure oxide of interest. In the following discussion, the two quantities (amount captured and vapor pressure of volatile component) are used interchangeably.

Example 1

Mass Balance

In this example, the use of a catalyst material comprising DT-52 with 2 wt % vanadia (prepared by evaporation of an alkaline monoethanolamine/vanadia solution) was held in a position upstream of a capture bed, in tests to demonstrate that the volatile components from the catalyst sample could be quantitatively captured by the downstream bed. The DT-52 support is commercially available from MIC, and has a composition of 90% $TiO_2$, 10% $WO_3$. A gamma alumina (Alfa Aesar, aluminum oxide, gamma, catalyst support, high surface area, bimodal) was used as the capture bed material and was additionally calcined at 800° C. for 6 hr in air, and had a nominal surface area of 200 m$^2$/g. A small quantity, 0.2 g of −14/+24 mesh, of the alumina was placed in a reactor tube in a position downstream of the catalyst sample. The alumina capture bed was separated from an equivalent amount (0.2 g) of −14/+24 mesh of the catalyst sample by a short (<1 cm) plug of quartz wool. A second, short plug of quartz wool downstream of the alumina capture bed was used to maintain the position of the alumina. DT-52 with 2 wt % vanadia was chosen as the catalyst sample in this experiment because it is known in the art that this material does not have a high degree of stability at high temperatures. To confirm that fact, the surface area of the starting, vanadia-doped DT-52 was 58 m²/g, while the surface area of the exposed and recovered material (as described below) was 12 m²/g. Hence the catalyst material underwent significant loss of surface area during the exposure. The catalyst material and alumina capture bed material were then exposed at 750° C. for 1 hr with a total gas flow of 65 L/hr, and both the catalyst sample and capture bed sample were manually recovered for analysis. The temperature for exposure of 750° C. was chosen instead of 670° C. since the former causes a comparable amount of catalyst to occur in a shorter period of time so that the test could be shortened from 64 hr to 1-4 hr, while still providing representative results. This gas flow represents a GHSV of ~200,000 hr$^{-1}$, and thus is many-fold higher than that used in the Ford [1] test. However, the higher flow enabled the vapor transport of volatile components to be greatly accentuated by virtue of the law of mass action, so as to ease the burden of subsequent volatile component recovery and analysis. Since lesser amounts of volatile components would be transported and recovered using lower flow conditions, the present test is considered to be a very sensitive method for determining the component volatility.

After the exposure, each sample was digested with concentrated aqueous HF, and analyzed by ICPES for tungsten and vanadium. The detection limits are 2.5 μg for each V and W per gram (ppm) of capture material (e.g., alumina).

The results, presented as an average of 4 separate runs, are given in Table 1.

TABLE 1

| Description | V (ppm) | W (ppm) |
|---|---|---|
| Starting Catalyst (DT-52 with 2 wt % vanadia) | 10075 | 72675 |
| Recovered Catalyst | 10425 | 71975 |
| Starting Capture Material (gamma alumina) | 0 | 0 |
| Recovered Capture Material | 19 | 4525 |
| Mass Balance, % | 104 | 105 |
| Std. Dev., % | 4.5 | 5.4 |

It can be seen that the loss of V to the vapor phase is minimal but measurable, while the loss of W is appreciable since the recovered capture alumina material contained roughly 0.45 wt % W. Also, it can be seen that the mass balances for each are essentially 100%, since the measured average mass balances are within one standard deviation of the theoretical value.

Example 2

Demonstration of Stability of Capture Material

This example demonstrates that once the tungsta and vanadia are present on the surface of the highly stable, high surface area capture material (in this case, gamma alumina) they are not volatile under the test conditions, even at exceedingly high exposure temperatures. Thus, a gamma alumina sample (Alfa Aesar, aluminum oxide, gamma, catalyst support, high surface area, bimodal) was loaded with 47013 ppm W and 11200 ppm V (by deposition from alkaline monoethanolamine solution) and subsequently calcined at 600° C. for 6 hr in air. This catalyst sample was positioned upstream of a downstream capture material (un-doped gamma alumina) as in Example 1. Separate tests demonstrated that the surface area of the W and V-doped alumina was 191 m²/g after exposure at 750° C. for 16 hr in an atmosphere that contained 10% $H_2O$, which demonstrates the high stability of the material. The catalyst and capture materials were then exposed to the reactant stream at 750° C. for 1 hr with a gas flow rate of 65 L/hr, and the spent samples were recovered and analyzed. There was no measurable amount of W or V on the capture bed, so that these oxides exhibit no volatility when supported on high surface area, highly stable alumina support. In summary Examples 1 and 2 demonstrate two important discoveries, namely that both V and W, when supported on a titania of low thermal stability, exhibit measurable volatility at 750° C., but V and W do not exhibit measurable volatility at the same temperature when supported on high stability, high surface area alumina.

Examples 3 through 7

Evaluation Of Various Vanadia-Based Of Catalyst Materials

The discoveries described in Examples 1 and 2 presented a method of the present invention as a means to investigate the volatility of various catalyst components such as V and W at the laboratory scale. Thus, in the following examples, SCR catalysts that contain tungsta and vanadia supported on various titania-based supports, were screened for the volatility of the catalyst components. The materials in these Examples all contained 2 wt % $V_2O_5$, deposited from alkaline monoethanolamine solution, and the V-doped materials were calcined at 600° C. for 6 hr in air to remove the water and organic components. The DT-58 base material is a commercially available titania-based SCR catalyst support available from MIC. The composition of the DT-58 support is 81% $TiO_2$, 9% $WO_3$ and 10% $SiO_2$. The samples in Examples 5 and 6, labeled MC-X5v1 and MC-X5v2, are developmental SCR catalyst supports as described hereinbelow in reference to "Stabilized Anatase Titania" and in U.S. patent application Ser. No. 12/533,414 which is expressly incorporated herein by reference in its entirety. The composition of the MC-X5v1 support is 90% $TiO_2$, 4% $SiO_2$ and 6% $WO_3$, while the composition of the MC-X5v2 support is 88% $TiO_2$, 8% $SiO_2$ and 4% $WO_3$.

TABLE 2

| Ex. | Material [a] | Condition | Surface Area (m²/g) | Pore Volume (cm³/g) | V (ppm) | W (ppm) | TFm |
|---|---|---|---|---|---|---|---|
| 4a | DT-58 | 670 C., 64 h, 10% $H_2O$, 6 L/h | 55.7 | 0.25 | N/A | N/A | N/A |
| 4 | DT-58 (b) | 750 C., 4 h, 5% $H_2O$, 32.5 L/h | 43.0 | 0.28 | 42.5 | 7150 | 5.6 |
| 5 | MC-X5v1 (b) | 750 C., 4 h, 5% $H_2O$, 32.5 L/h | 38.7 | 0.25 | 1.7 | 753.5 | 3.1 |
| 3 | DT-52 (b) | 750 C., 4 h, 5% $H_2O$, 32.5 L/h | 8.3 | 0.05 | 82.6 | 8,050 | 9.3 |
| 6 | MC-X5v2 (b) | 750 C., 4 h, 5% $H_2O$, 32.5 L/h | 59.6 | 0.29 | 0.0 | 190.5 | 3.0 |

[a] = 2 wt % $V_2O_5$
(b) = average of multiple runs

It was first desired to determine a set of conditions that would be representative of the real-life exposure of a catalyst. As described above, Ford researchers[1] have developed an accelerated aging protocol for SCR catalysts that are positioned downstream of a diesel particulate filter (DPF), that simulates on-road exposure for 120,000 miles. The accelerated aging test involves exposing the catalyst to a reactant gas stream that includes water (5 vol %), for a time of 64 hr at 670° C. at GHSV=30,000 hr$^{-1}$. These exposure conditions represent the extremely harsh conditions that would occur as the result of the high temperatures created during soot-combustion during regeneration of the DPF, and are not normally encountered in traditional SCR applications.

Thus, the DT-58 and MC-X5v1 catalysts were exposed for 64 hr at 670° C. in an atmosphere that contained 10 vol % $H_2O$, and the surface area and pore volumes of the aged catalysts was determined as shown in Table 2. The same starting catalyst materials were also utilized as the catalyst samples in a dual bed configuration upstream of a downstream gamma alumina capture bed, and were treated at 750° C. as described in Examples 1 and 2, above, only the exposure time was 4 hr and the reactant gas flow was 32.5 L/hr (equivalent to GHSV~100,000 hr$^{-1}$). The gas flow rate under these conditions is still higher than in the Ford[1] test, but is more closely representative of that test.

The results in Table 2 show that the surface areas for the catalysts exposed in the test method of the present invention at 750° C. for 4 hr were slightly lower than for the same materials aged at 670° C. for 64 hr. Thus, if the surface area is used as a measure of the extent to which the catalyst samples have aged (and hence severity), then the conditions in the former test are slightly more severe than in the Ford[1] test. Thus, it is concluded that the test of the present invention, when conducted at 750° C. for 4 hr with a reactant gas flowing at 32.5 L/hr, is a good first approximation to the real-life exposure of the catalyst over the duration of 120,000 miles of on-road use.

Figure 3:
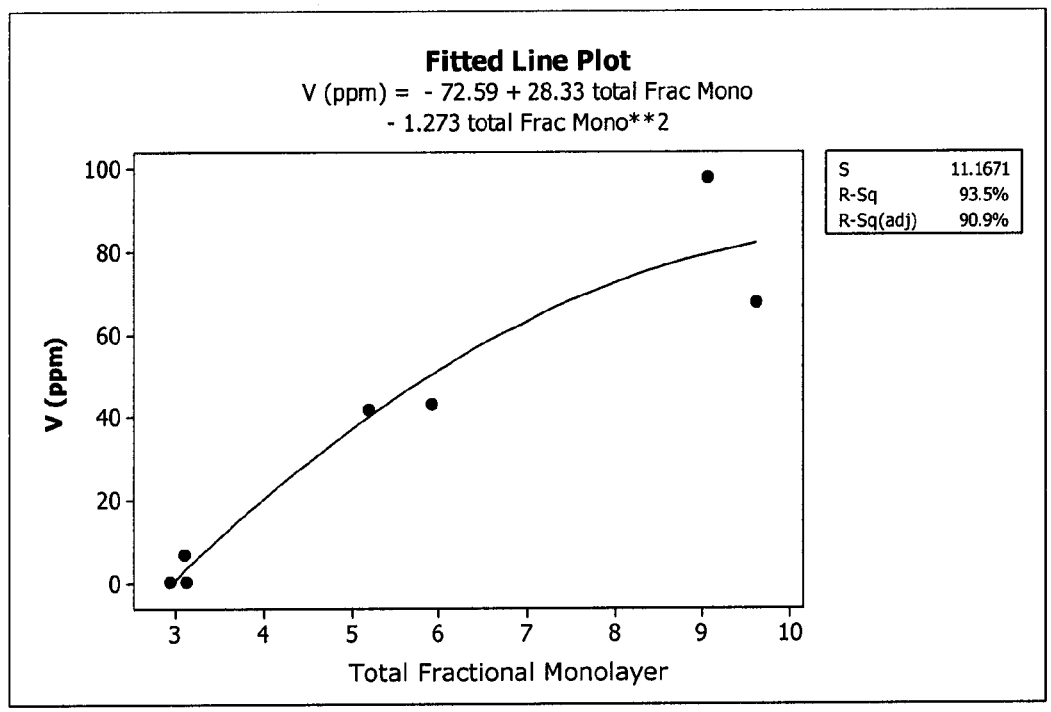
FIG. 3 is a graph showing the relationship between the Total Fractional Monolayer values and the vanadium volatility
Figure 4:
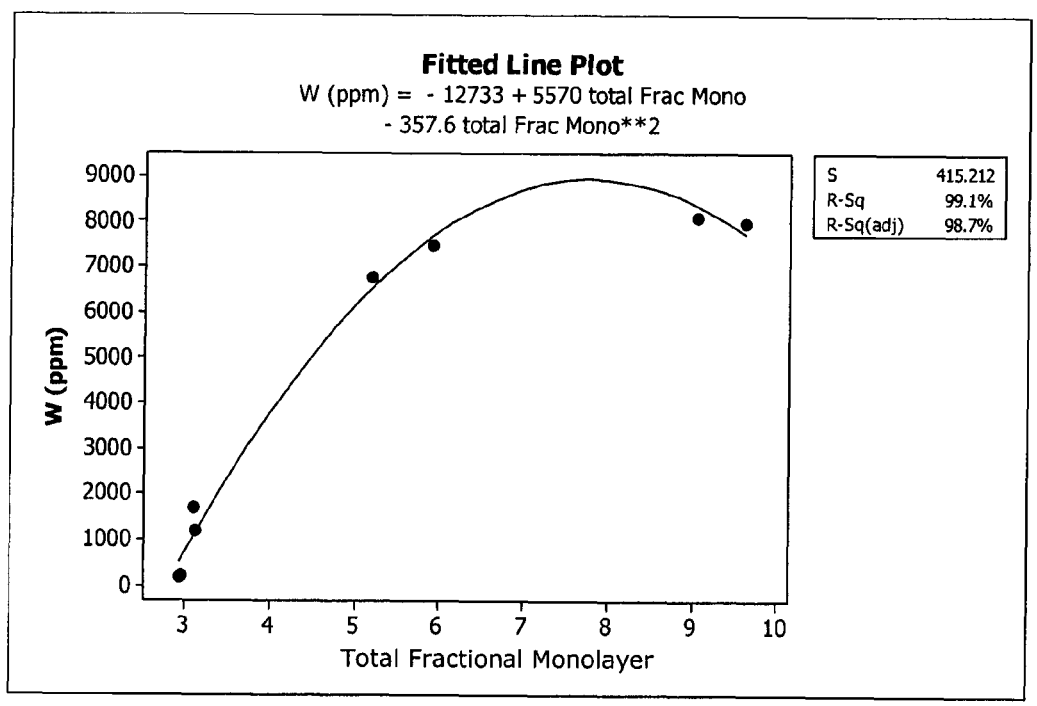
FIG. 4 is a graph showing the relationship between the Total Fractional Monolayer values and the tungsten volatility.

Each of the catalysts listed in Table 2 were evaluated multiple times and average results are shown therein. The results in Table 2 demonstrate that the catalysts show varying degrees of loss of V and W. Also shown in Table 2 are the Total Fractional Monolayer ($Tf_m$) values for each material, where the surface area is that of the aged samples. Shown in FIGS. 3 and 4 are the correlations found between the amount of V and W lost from the catalyst samples and the $Tf_m$ values. The data and graphs show that when the $TF_m$ values are equal to or less than about 3.1, the vanadia and tungsta catalyst components exhibit low volatility and are substantially retained on the catalyst material, while when the $TF_m$ values are greater than 3.1, the catalyst components exhibit much higher volatility and are lost from the catalyst material (but are captured on the capture material). Of course, even with the relatively high levels of V and W that are lost from the DT-52 catalyst material, when these volatile oxides and hydroxides are captured on the capture bed material, e.g., alumina, the $TF_m$ for that material is much less than 1 after the exposure. These good correlations can be used to predict the behavior of unknown materials that might be useful as catalyst and capture materials. Thus, vanadia-based titania materials that have high aged surface areas and low amounts of added catalyst components such as $SiO_2$ and $WO_3$ will demonstrate little to no loss of W and V to the vapor phase under these harsh exposure conditions, and hence will be attractive catalyst materials. Such support materials will also be good capture materials in the event that less stable, high $TF_m$ catalyst materials such as vanadia on DT-52 are positioned upstream or in intimate mixture with the more stable, low $TF_m$ materials.

Without being bound by theory, it is believed that the reason for the low volatility of the minority-phase components on alumina or stabilized titania (or other materials contemplated herein) is that when the minority-phase components are present at low fractional coverage (low $f_m$), they interact strongly chemically with the majority-phase support, and this favorable interaction energy in turn lowers the equilibrium constants involved in the vaporization of the supported components.

Stabilized Anatase Titania.

In preferred embodiments, the material which comprises the majority phase catalyst material and/or the capture bed material used herein is an anatase titania (described in more detail in U.S. Ser. No. 12/533,414), wherein the anatase titania is stabilized by a silica provided in a low molecular weight form and/or small nanoparticle form. Further, the minority phase disposed on the anatase titania preferably comprises vanadia (and optionally tungsta), for vanadia-based selective catalytic reduction of DeNOx from lean-burn (diesel) engines.

The actual specific composition of the silica-titania or silica-titania-tungsta catalyst support material (majority phase) and/or capture bed material may be dictated by the requirements of the specific catalytic application. In one preferred composition, the material comprises a silica-stabilized titania material which comprises particles which contain ≧90% dry weight of $TiO_2$ and ≦10 wt % $SiO_2$. In another preferred composition, the material comprises a silica stabilized titania-tungsta material with ≧85% dry weight titania, 3%-10% dry weight of $SiO_2$, and 3%-10% dry weight of $WO_3$. Alternatively, in one embodiment where the application requires particularly good thermal stability, the material comprises ≧85% dry weight of $TiO_2$, 5.0%-9.0% dry weight of $SiO_2$, and 3.0%-7.0% dry weight of $WO_3$. More particularly, the material may comprise 87%-89% dry weight of $TiO_3$, 7%-9% dry weight of $SiO_2$, and 3%-5% dry weight of $WO_3$. In one preferred embodiment the material comprises about 88% (±0.5%) dry weight $TiO_2$, about 8% (±0.5%) dry weight $SiO_2$, and about 4% (±0.5%) dry weight $WO_3$. In one embodiment, the weight % of $WO_3$ is less than the weight of % of $SiO_2$. In one embodiment, the material has a fresh surface area of at least 80 m$^2$/gm, and more preferably at least 100 m$^2$/gm.

In another embodiment where the application requires particularly good catalytic activity or capture of volatiles, the material comprises ≧85% dry weight of $TiO_2$, 3.0%-8.0% dry weight of $SiO_2$, and 4.0%-9.0% dry weight of $WO_3$. More particularly, this active material comprises ≧87% dry weight of $TiO_3$, 3%-6% dry weight of $SiO_2$, and 4%-8% dry weight of $WO_3$. In one preferred embodiment the material comprises about 90% (±0.5%) dry weight $TiO_2$, about 4% (±0.5%) dry weight $SiO_2$, and about 6% (±0.5%) dry weight $WO_3$. In one embodiment, the weight % of $WO_3$ is greater than the weight of % of $SiO_2$.

In an embodiment of the invention, the $TiO_2$ component of the material used herein substantially comprises a surface area <400 m$^2$/g and a pore volume <0.40 cm$^3$/g.

In one embodiment, the material is produced by mixing a titania slurry and a silica component at a temperature <80° C. and at a pH <8.5. Alternatively, the titania slurry and silica component used herein may be mixed at a temperature <70° C. and at a pH <7.0.

The vanadia catalyst of the invention may comprise the silica-stabilized titania or titania-tungsta catalyst support described herein upon which a quantity of vanadium oxide ($V_2O_5$) is disposed, wherein the $V_2O_5$ preferably comprises 0.5% to 1% to 2% to 3% to 4% to 5% of the dry weight thereof. The vanadia catalyst materials of the invention may be further treated by calcination (sintering) at a temperature $\geqq 650°$ C. to increase their deNOx catalytic activity.

The emission system of the invention with may be used with a diesel particulate filter (DPF) upstream of the engine or downstream of the engine.

Preferably most of the silica particles in the silica-stabilized titania material have diameters <5 nm, and more preferably <4 nm and more preferably <3 nm, and still more preferably <2 nm, and/or comprise low molecular weights (e.g., MW<100,000), whether or not the particles do, or do not, have $V_2O_5$ deposited thereon.

Where the silica titania material also has $V_2O_5$ deposited thereon the $V_2O_5$ preferably comprise from 0.5% to 3.0% to 5% of the dry weight of the material.

Distribution of the $WO_3$ and $SiO_2$ species on the surface of the titania material also plays a role in the optimization of DeNOx activity of the vanadia catalysts. Thus, when the catalysts are freshly prepared, that is, when the added silica and tungsta oxides are first deposited and before high temperature treatment, the fractional monolayer coverage is preferably about 1.0 or less.

The $SiO_2$ may be present at a fractional monolayer value of less than 1.0 before the material is sintered. The small nanoparticle form of the $SiO_2$ may comprise a diameter of <5 nm. The low molecular weight form of the $SiO_2$ may comprise a MW of <100,000. The $SiO_2$ may comprise silicon atoms which are substantially (e.g., >50%) in the $Q^3$, $Q^2$, $Q^1$ and $Q^0$ coordination environments. The $SiO_2$ may comprise patches which are substantially $\geqq 5$ nm deep after redistribution as seen by scanning electron microscopy or by transmission electron microscopy. The $TiO_2$ used may optionally not be prepared in the presence of urea.

In another aspect, the invention may be a vanadia catalyst comprising a silica-stabilized titania material as described herein which comprises $V_2O_5$ disposed thereon. The vanadia catalyst may comprise, for example, 0.5% to 5% dry weight of $V_2O_5$ (or more preferably 1.0 to 3%). The $V_2O_5$ may be present at a fractional monolayer value of less than 1.0 before sintering. The vanadia catalyst may be sintered at $\geqq 650°$ C. for example. In another aspect, the invention may be a diesel selective catalytic reduction catalyst system comprising the vanadia catalyst and capture bed material as described herein. In another aspect a diesel engine exhaust treatment system may further comprise a diesel particulate filter, and wherein the present catalytic capture bed device is positioned upstream of or downstream of the diesel particulate filter.

In another one of its aspects, the invention is a method of catalyzing the conversion of nitrogen oxides to $N_2$ gas, comprising exposing engine emissions comprising NOx to the vanadia catalyst as described herein with an added reductant to produce $N_2$ and $H_2O$. The reductant may be for example $NH_3$ and/or urea. In the method the vanadia catalyst may comprise 0.5%-5% (or more preferably 1.0% to 3%) dry weight of $V_2O_5$, for example. The engine emissions may be passed through a diesel particulate filter before or after being exposed to the vanadia catalyst wherein the emissions are then passed through the capture bed material.

As noted above, the stabilization of titania material with silica preferably involves treatment of the titania with silica in a low molecular weight form and/or small nanoparticle form, such as tetra(alkyl)ammonium silicate (e.g., tetramethylammonium silicate) or tetraethylorthosilicate (TEOS). Other examples of low molecular weight and/or small nanoparticle silica precursors which may be used in the present invention include, but are not limited to aqueous solutions of silicon halides (i.e., anhydrous $SiX_4$, where X=F, Cl, Br, or I), silicon alkoxides (i.e., $Si(OR)_4$, where R=methyl, ethyl, isopropyl, propyl, butyl, iso-butyl, see-butyl, tert-butyl, pentyls, hexyls, octyls, nonyls, decyls, undecyls, and dodecyls, for example), other silicon-organic compounds such as hexamethyldisilazane, fluoro-silicic acid salts such as ammonium hexafluorosilicate [$(NH_4)_2SiF_6$], quaternary ammonium silicate solutions (e.g., $(NR_4)n$, $(SiO_2)$, where R=H, or alkyls such as listed above, and when n=0.1-2, for example), aqueous sodium and potassium silicate solutions ($Na_2SiO_3$, $K_2SiO_3$, and $MSiO_3$ wherein M is Na or K in varying amounts in ratio to Si); silicic acid ($Si(OH)_4$) generated by ion exchange of any of the cationic forms of silica listed herein using an acidic ion-exchange resin (e.g., ion-exchange of the alkali-silicate solutions or quaternary ammonium silicate solutions). In preferred embodiments, the titania used herein has not been prepared in the presence of urea.

The catalyst support material and/or capture bed material may be produced by providing a slurry comprising $TiO_2$, combining the $TiO_2$ slurry with (1) a silica precursor solution comprising $SiO_2$ substantially in a low molecular weight form and/or $SiO_2$ comprising small nanoparticles and with (2) $WO_3$ to form a $TiO_2$—$WO_3$—$SiO_2$ mixture, wherein the silica precursor solution is combined with the $TiO_2$ slurry before, after, or while the $WO_3$ is combined with the $TiO_2$ slurry, and then washing and sintering the $TiO_2$—$WO_3$—$SiO_2$ mixture to form a silica-stabilized titania support material. In the method the silica-stabilized titania support material may comprise, for example, 86%-94% dry weight of $TiO_2$, 3%-9% dry weight of a $SiO_2$, and 3%-7% dry weight of $WO_3$, and the titania support material may primarily comprise a surface area of at least 80 $m^2$/gm before sintering. The $TiO_2$ of the slurry may comprise, for example, preformed titanium hydroxide, titanium oxy-hydroxide or titanium dioxide particles. Optionally, the $TiO_2$ of the slurry is not produced in the presence of urea.

The silica precursor solution may comprise a tetra(alkyl) ammonium silicate solution or silicic acid. The $SiO_2$ may substantially comprise patches which are $\leqq 5$ nm in depth after redistribution as seen by scanning electron microscopy or by transmission electron microscopy. The method may further comprise combining the $TiO_2$—$WO_3$—$SiO_2$ mixture with $V_2O_5$ to form a vanadia catalyst. The vanadia catalyst thus formed may comprise, for example, 0.5% to 3% to 5% dry weight of $V_2O_5$. The $V_2O_5$ thereof may be present at a fractional monolayer value of less than 1.0 before sintering. The vanadia catalyst may be sintered at $\geqq 650°$ C. for example.

Alternatively, the silica-stabilized titania material may be produced by providing a $TiO_2$ slurry comprising $TiO_2$ particles, providing a particulate silica source, combining the $TiO_2$ slurry with the particulate silica source to form a $TiO_2$—$SiO_2$ mixture, and adjusting the $TiO_2$—$SiO_2$ mixture to a pH <8.5 and a temperature <80° C. wherein the particulate silica source is dissolved and reprecipitated on the $TiO_2$ particles to form the silica-stabilized titania material. The method may further comprise the step of combining the silica-stabilized titania material with $WO_3$ to form a silica-stabilized titania tungsten material. The method may further comprise washing and sintering the silica-stabilized titania tungsten material. The silica-stabilized titania tungsten material may comprise, for example, 86%-94% dry weight of $TiO_2$, 3%-9% dry weight of a $SiO_2$, and 3%-7% dry weight of $WO_3$, and the titania material may primarily comprise a surface area of at least 80 $m^2$/gm before sintering. The $TiO_2$ particles of the $TiO_2$ slurry may comprise, for example, preformed titanium hydroxide, titanium oxy-hydroxide or titanium dioxide particles. The $SiO_2$ of the $TiO_2$—$SiO_2$ mixture, after dissolving, may comprise silicon atoms which are substantially (e.g., >50%) in the $Q^3$, $Q^2$, $Q^1$ and $Q^0$ coordination environments. The $SiO_2$ on the $TiO_2$ particles of the method may substantially comprise patches which are $\leq 5$ nm in depth after redistribution of the $SiO_2$ as seen by scanning electron microscopy or by transmission electron microscopy. The method may further comprise combining the $TiO_2$—$WO_3$—$SiO_2$ mixture with $V_2O_5$ to form a vanadia catalyst. In the method, the vanadia catalyst may comprise, for example, 0.5%-3% dry weight of $V_2O_5$. The $V_2O_5$ of the vanadia catalyst may be present at a fractional monolayer value of less than 1.0 before sintering, and the vanadia catalyst may be sintered at $\geq 650°$ C.

As contemplated herein, in one embodiment, the invention is a selective catalytic reduction catalyst system for treating diesel exhaust gas containing nitrogen oxides and diesel soot particulates. The system comprises a catalyst material and a capture material. The catalyst material comprises a majority phase which may comprise a titania-based support material, and a minority phase comprising a catalyst component comprising at least one oxide of vanadium, silicon, tungsten, molybdenum, iron, cerium, phosphorous, copper or manganese. The capture material comprises a majority phase for capturing a minority phase comprising volatile oxides or hydroxides originating from the catalyst material, wherein the minority phase of the capture material maintains a total fractional monolayer coverage on the majority phase of the capture material of about 5 or less. The capture material is positioned in a mixture with the catalyst material, or is located downstream of the catalyst material or is positioned in a mixture with the catalyst material and is located downstream of the catalyst material. The minority phase of the capture material in this embodiment may maintain a total fractional monolayer coverage of 5 or less on the majority phase of the capture material when exposed to conditions of 750° C. for 4 hours at a gas-hourly space velocity of 100,000 $hr^{-1}$ and 5 vol % water. The minority phase catalyst components of the catalyst material may maintain a total fractional monolayer value of 5 or less on the majority phase after exposure to conditions of 750° C. for 4 hours at a gas-hourly space velocity of 100,000 $hr^{-1}$ and 5 vol % water. The capture material is preferably able to remove substantially all volatile oxides and hydroxides originating from the catalyst material. The majority phase of the capture material may primarily comprise at least one of aluminas, stabilized aluminas, silicas, silica-aluminas, amorphous silicas, titanias, silica-stabilized titanias, zeolites or molecular sieves or combinations thereof. Where the majority phase is a stabilized alumina, the stabilized aluminas may be stabilized by lanthanum or other lanthanides. The majority phase of the capture material and the majority phase of the catalyst material may comprise titania stabilized with silica.

In another embodiment the present invention contemplates a diesel engine exhaust treatment system comprising a selective catalytic reduction catalyst system and a diesel particulate filter for treating diesel exhaust gas containing nitrogen oxides and diesel soot particulates. The catalyst system comprises a catalyst material and a capture material. The catalyst material comprises a majority phase which may comprise a titania-based support material, and a minority phase comprising a catalyst component comprising at least one oxide of vanadium, silicon, tungsten, molybdenum, iron, cerium, phosphorous, copper or manganese. The capture material may comprise a majority phase for capturing a minority phase comprising volatile oxides or hydroxides originating from the catalyst material, wherein the minority phase of the capture material maintains a total fractional monolayer coverage on the majority phase of the capture material of about 5 or less.

The capture material may be positioned in a mixture with the catalyst material, or may be located downstream of the catalyst material, or may be positioned in a mixture with the catalyst material and located downstream of the catalyst material. The selective catalytic reduction catalyst system may be positioned upstream of or downstream of the diesel particulate filter. The minority phase of the capture material in this embodiment may maintain a total fractional monolayer coverage of 5 or less on the majority phase of the capture material when exposed to conditions of 750° C. for 4 hours at a gas-hourly space velocity of 100,000 $hr^{-1}$ and 5 vol % water. The minority phase catalyst components of the catalyst material may maintain a total fractional monolayer value of 5 or less on the majority phase after exposure to conditions of 750° C. for 4 hours at a gas-hourly space velocity of 100,000 $hr^{-1}$ and 5 vol % water. The capture material is preferably able to remove substantially all volatile oxides and hydroxides originating from the catalyst material. The majority phase of the capture material may primarily comprise at least one of aluminas, stabilized aluminas, silicas, silica-aluminas, amorphous silicas, titanias, silica-stabilized titanias, zeolites or molecular sieves or combinations thereof. Where the majority phase is a stabilized alumina, the stabilized aluminas may be stabilized by lanthanum or other lanthanides. The majority phase of the capture material and the majority phase of the catalyst material may comprise titania stabilized with silica.

In another embodiment, the present invention is a method of treating diesel exhaust gas comprising the steps of providing a selective catalytic reduction catalyst system, with or without a diesel particulate filter, and exposing the diesel exhaust gas to the selective catalytic reduction catalyst system wherein the capture material removes substantially all volatile oxides and hydroxides originating from the catalyst material from the diesel exhaust gas. In this method the selective catalytic reduction catalyst system comprises a catalyst material and a capture material. The catalyst material comprises a majority phase which may comprise a titania-based support material, and a minority phase comprising a catalyst component comprising at least one oxide of vanadium, silicon, tungsten, molybdenum, iron, cerium, phosphorous, copper or manganese. The capture material comprises a majority phase for capturing a minority phase comprising volatile oxides or hydroxides originating from the catalyst material, wherein the minority phase of the capture material maintains a total fractional monolayer coverage on the majority phase of the capture material of about 5 or less. The capture material is positioned in a mixture with the catalyst material, or is located downstream of the catalyst material or is positioned in a mixture with the catalyst material and is located downstream of the catalyst material. The minority phase of the capture material in this embodiment may maintain a total fractional monolayer coverage of 5 or less on the majority phase of the capture material when exposed to conditions of 750° C. for 4 hours at a gas-hourly space velocity of 100,000 $hr^{-1}$ and 5 vol % water. The minority phase catalyst components of the catalyst material may maintain a total fractional monolayer value of 5 or less on the majority phase after exposure to conditions of 750° C. for 4 hours at a gas-hourly space velocity of 100,000 $hr^{-1}$ and 5 vol % water. The capture material is preferably able to remove substantially all volatile oxides and hydroxides originating from the catalyst material. The majority phase of the capture material may primarily comprise at least one of aluminas, stabilized aluminas, silicas, silica-aluminas, amorphous silicas, titanias, silica-stabilized titanias, zeolites or molecular sieves or combinations thereof. Where the majority phase is a stabilized alumina, the stabilized aluminas may be stabilized by lanthanum or other lanthanides.

The majority phase of the capture material and the majority phase of the catalyst material may comprise titania stabilized with silica.

While the invention has been described in connection with certain preferred embodiments and examples herein so that aspects thereof may be more fully understood and appreciated, it is not intended to limit the invention to these particular embodiments and examples. Thus, the present examples, which include preferred embodiments serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Therefore, although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the machines, processes, items of manufacture, compositions of matter, means, methods and steps described in the specification. As one of ordinary skill in the art will readily appreciate from the disclosure of the present invention, machines, processes, items of manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such machines, processes, items of manufacture, compositions of matter, means, methods, or steps.

Each of the patents, published patent applications, references and articles cited herein are hereby expressly incorporated herein by reference in their entireties.

CITED REFERENCES

1. G. Cavataio, et al., Society of Automotive Engineers 2007-01-1575, 455 (2007).
2. Weckhuysen, B. M., and Keller, D. E., "Chemistry, Spectroscopy and the Role of Supported Vanadium Oxides in Heterogeneous Catalysis", Catalysis Today 78:25-46, 2003.
3. Wachs, I. E., Kim, T., Ross, E. I., "Catalysis Science of the solid Acidity of Model Supported Tungsten Oxide Catalysts", Catalysis Today 116:162-168, 2006.
4. Iler, R. K. The Chemistry of Silica: Solubility, Polymerization, Colloid and Surface Properties, and Biochemistry, John Wiley & Sons, New York, ISBN 0-471-02404-x:31, 1979.

What is claimed is:

1. A method of treating diesel exhaust gas, comprising:
   exposing diesel exhaust gas to a selective catalytic reduction catalyst system comprising:
     a catalyst bed material comprising:
       a majority phase containing a titania-based support material, and a minority phase containing a catalyst component which includes vanadium oxide; and
     a capture bed material containing a majority phase for capturing a minority phase comprising volatile metal oxides or volatile metal hydroxides originating from the catalyst bed material, wherein the minority phase of the capture bed material is maintained at a total fractional monolayer coverage on the majority phase of the capture bed material of 3.1 or less; and
   wherein the capture bed material removes substantially all volatile metal oxides and volatile metal hydroxides originating from the catalyst bed material from the diesel exhaust gas.

2. The method of claim 1 wherein the minority phase of the capture bed material of the selective catalytic reduction catalyst system is maintained at a total fractional monolayer coverage on the majority phase of the capture bed material of 3.1 or less when exposed to conditions of 750° C. for 4 hours at a gas-hourly space velocity of 100,000 hr$^{-1}$ and 5 vol % water.

3. The method of claim 1 wherein the minority phase catalyst components of the catalyst bed material of the selective catalytic reduction catalyst system are maintained at a total fractional monolayer value of 5 or less on the majority phase after exposure to conditions of 750° C. for 4 hours at a gas-hourly space velocity of 100,000 hr$^{-1}$ and 5 vol % water.

4. The method of claim 1 wherein the majority phase of the capture bed material of the selective catalytic reduction catalyst system primarily comprises at least one of aluminas, stabilized aluminas, silicas, silica-aluminas, amorphous silicas, titanias, silica-stabilized titanias, zeolites or molecular sieves or combinations thereof.

5. The method of claim 4 wherein the stabilized aluminas of the capture bed materials are stabilized by lanthanum or other lanthanides.

6. The method of claim 1 wherein the majority phase of the capture bed material and the majority phase of the catalyst bed material of the selective catalytic reduction catalyst system comprise titania stabilized with silica.

7. The method of claim 1 wherein the selective catalytic reduction catalyst system is provided as a component of a diesel engine exhaust treatment system which further comprises a diesel particulate filter.

8. The method of claim 1 wherein the minority phase of the catalyst bed material further contains at least one oxide of silicon, tungsten, molybdenum, iron, cerium, phosphorus, copper, manganese, or a combination thereof.

* * * * *